UNITED STATES PATENT OFFICE.

ARMAND MÜLLER, OF MOUNT VERNON, ASSIGNOR TO JOHN E. BRUSTLEIN AND PAUL SURY, OF NEW YORK, N. Y.

INSECTICIDE.

SPECIFICATION forming part of Letters Patent No. 322,630, dated July 21, 1885.

Application filed December 11, 1883. (Specimens.)

*To all whom it may concern:*

Be it known that I, ARMAND MÜLLER, doctor of philosophy, of Mount Vernon, county of Westchester, State of New York, have invented certain new and useful Improvements in mixtures for use as Insecticides, of which the following is a specification.

My invention relates to a dissolving compound, which is especially useful as anti-parasitic for trees, shrubs, and other plants; and it consists in preparing the solution of bisulphide of carbon, which is insoluble in water, in the pure concentrated alkaline salt of sulpholeic or sulphoricinoleic acid, and said preparation is made as follows: Any of the compounds called "triglycerides" $[C_3H_3(C_{18}H_{33}O_3)O_3]$—as, for instance, castor-oil—is constantly cooled and mixed with from 25 per cent. to 50 per cent. of cooled sulphuric acid, of about 60° Baumé, and care is taken that the mixture does not reach a temperature above 100° or 112° Fahrenheit. At this temperature any amount, but best a volume of water of twice the volume of the oil used, is added, and then the mixture is left for some time in order to separate the surplus of sulphuric acid which has not combined; after which, by means of a suitable device, arranged like a separating-funnel with cock, the watery layer is to be separated from the oily layer. This oily layer, consisting of a sulpholeic acid of the general formula $C_nH_{2n}\text{-}SO_5$ or $C_nH_{2n-2}SO_6$, in which a triglyceride is to be found, may be treated in either of two ways: Either it is combined directly with an alkali—as, for instance, potassic hydrate, (KOH,) sodic hydrate, (NaOH,) and ammoniac hydrate $(NH_4OH,)$ which combinations will show already very valuable dissolving qualities—or a better result is obtained if the not neutralized sulpholeic acid is first diluted in distilled water, the volume of which may be a multiple of the volume of the acid. This solution is left to settle for some time, whereupon the unchanged glyceride will be separated from the sulpholeic acid along with small quantities of oxidized oleic acid, $(C_{18}H_{34}O_3,)$ which has formed by decomposition. The sulpholeic acid, still diluted in water, is now separated by adding mineral acids, and then it is neutralized by addition of an alkali—as, for instance, oxide of sodium $(Na_2O,)$ or potassic hydrate, (KOH,) of which the latter is full equivalent to the first. Thus a purer sulpholeic-acid salt—for instance, $C_{17}H_{32}\begin{cases}SO_3 Na_2 O\\ CO_2 Na_2 O,\end{cases}$ (sulphoricinoleate of sodium)—is received than by the first-named process, and this salt, especially in the concentrated state, will have a considerably greater dissolving-power than the salt obtained by the direct combination of sulpholeic acid with an alkali. The salt obtained by this second and better process serves as the base for my preparations, which are made by mixing the salt with bisulphide of carbon in the proportion of 25 to 50 units of weight of bisulphide of carbon with 100 parts of the salt.

I am well aware that bisulphide of carbon, carbolic acid, and kerosene have been used heretofore as anti-parasitics on trees, &c. These substances, however, required a medium to be diluted with, and, as such a medium, either milk or soap-water was used. The mentioned bodies, however, being not or very little soluble in milk and soap-water, would remain on the surface of the tree in their full strength, and only a weak solution would penetrate the bark of the tree. The bodies—for instance, bisulphide of carbon and soap-water—would therefore remain separated. The bisulphide of carbon, where remaining in its full strength, would destroy the tree, and where only partly diluted would have no effect at all on the insects in the bark. Therefore only the weaker ones of the above named substances were hitherto considered as useful and beneficial, while the stronger ones were considered to be too dangerous for the trees. However, if a salt of the general formula $C_{17}H_{32}\begin{cases}SO_3M'\\ CO_2M',\end{cases}$ or if the salt called sulforicinoleate of sodium $(C_{17}H_{32})$ $\begin{cases}SO_3Na_2O\\ CO_2Na_2O,\end{cases}$ is used as medium for dissolving bisulphide of carbon, $(CS_2,)$ the effect will be different. Dissolved in sulphoricinoleate of sodium the bisulphuret of carbon will become soluble also in water, and will be equally distributed throughout the solution. The different substances or bodies will not separate, and the solution can be made of any desired weakness simply by the addition of water. A solution of one part of said salt with ten parts of water will penetrate the bark of trees, softening the same, and will instantly kill any insect therein, or any moss or fungus on the surface of the bark, without injury to the tree.

Having thus described my invention, what I claim as new, and desire to secure by Letters Patent, is—

The mixture consisting of sulphoricinoleate of sodium, $C_{17}H_{32}\begin{Bmatrix} SO_3Na_2O \\ CO_2Na_2O, \end{Bmatrix}$ and bisulphide carbon ($CS_2$,) the whole forming an anti-parasitic for destroying insects, moss, and fungi.

In testimony whereof I hereunto sign my name, in the presence of two subscribing witnesses, this 27th day of November, 1883.

ARMAND MÜLLER.

Witnesses:
RENÉ GEELHAAR,
E. LEIBUNDGUT.